United States Patent [19]

Blumenkranz

[11] Patent Number: 4,508,368
[45] Date of Patent: Apr. 2, 1985

[54] PLASTIC PIPE JOINT

[75] Inventor: James J. Blumenkranz, Hollywood, Calif.

[73] Assignee: R & G Sloane Mfg. Co., Inc., Sun Valley, Calif.

[21] Appl. No.: 353,157

[22] Filed: Mar. 1, 1982

[51] Int. Cl.³ ............................................. F16L 47/02
[52] U.S. Cl. .................................... 285/21; 156/294; 285/423
[58] Field of Search ................. 285/21, 423, DIG. 16, 285/287, 345; 156/294, 273.9

[56] References Cited

U.S. PATENT DOCUMENTS

| | | | |
|---|---|---|---|
| 2,050,728 | 8/1936 | Ost | 285/287 |
| 2,398,788 | 4/1946 | Hedrick | 285/DIG. 16 X |
| 2,739,829 | 3/1956 | Pedlow et al. | |
| 2,741,402 | 4/1956 | Sayre | |
| 3,062,940 | 11/1962 | Bauer | |
| 3,094,452 | 6/1963 | Von Riegen | |
| 3,198,560 | 8/1965 | Collins | 285/345 X |
| 3,506,519 | 4/1970 | Blumenkranz | |
| 3,542,402 | 11/1970 | Caples | |
| 3,784,235 | 1/1974 | Kessler | |
| 3,788,928 | 1/1974 | Wise | |
| 3,943,334 | 3/1976 | Sturm | |
| 3,989,280 | 11/1976 | Schwarz | |
| 4,176,274 | 11/1979 | Lippera | |
| 4,368,894 | 1/1983 | Parmann | 285/345 X |
| 4,436,988 | 3/1984 | Blumenkranz | 285/21 X |

FOREIGN PATENT DOCUMENTS

| | | | |
|---|---|---|---|
| 206777 | 7/1955 | Australia | 285/287 |
| 1048106 | 12/1958 | Fed. Rep. of Germany | 285/21 |
| 695027 | 8/1953 | United Kingdom | 156/294 |
| 808725 | 2/1959 | United Kingdom | 285/21 |
| 809560 | 2/1959 | United Kingdom | |
| 1223128 | 2/1971 | United Kingdom | 285/21 |

Primary Examiner—Thomas F. Callaghan
Attorney, Agent, or Firm—Fulwider, Patton, Rieber, Lee & Utecht

[57] ABSTRACT

A joint configuration for joining two articles of thermoplastic material by thermal bonding using an electrical heating element, wherein a female fitting having a portion with an enlarged diameter receives the end of an inserted pipe on two raised portions constituting lands on the inner diameter of the fitting, and the central annular recess between the two lands receives and positions the electrical heating element which fuses the thermoplastic material. The two lands, each compressed against the outside of the inserted pipe by an external clamp, confine and retain the fused thermoplastic material within the central annular recess to effect an increased internal pressure which promotes the formation of an extensive, continuous, and sound bond between the fitting and the inserted pipe.

10 Claims, 3 Drawing Figures

PLASTIC PIPE JOINT

BACKGROUND OF THE INVENTION

This invention relates generally to fittings for joining articles, and more particularly, to a joint configuration for forming lap joints to a thermoplastic pipe by thermal bonding using an electrical heating element.

Thermoplastic polymers are used widely to manufacture articles such as pipes and pipe fittings which require good corrosion and chemical resistance, low weight and good fabricability. The joining of articles made of thermoplastic material may be accomplished by mechanical means such as threaded connections and flanges, by chemical means such as solvent bonding, or by thermal means such as fusing thermoplastic material at the location where the articles to be bonded meet. As an example, in a conventional approach a pipe may be thermally bonded to a fitting by providing a diametrically enlarged female portion on the fitting, heating the inside of the enlarged portion and the outside of the end of the pipe to fuse the thermoplastic on each, and forcing the pipe end into the enlarged portion while the thermoplastic is in a fused, somewhat fluid state. Upon cooling, the fused thermoplastic materials join and bond the articles together.

When a joint is formed by thermal bonding, it is desirable that the areas joined be relatively extensive to provide a large force-bearing area for high joint strength and a continuous layer around the entire circumference of the joint to seal the liquid within the pipes, and it is further desirable that the joint be sound and without internal defects such as air bubbles which might reduce the fracture strength of the joint by providing a fracture path for cracks. However, when articles are joined by the conventional thermal bonding approach described above, the joint may not be satisfactory, as some of the fused thermoplastic may be forced into the inside of the fitting and pipe to impede fluid flow, and because there may be leakage paths through the joint resulting from the sticking of the fused thermoplastic to the tooling of the heating unit.

In an approach to improving the bonding in the joint, the enlarged portion is provided sufficiently oversize that a heating coil may be placed between the outside diameter of the pipe and the inside of the enlarged portion of the fitting and heated by the passage of an electrical current to fuse the thermoplastic lying around and adjacent the heating coil with the pipe already in place within the enlarged portion. In thermal bonded joints formed by this approach, as the thermoplastic fuses it becomes free to flow within the joint area, and as a result may simply flow away from some portions of the intended joint without achieving a desirably extensive, continuous, and sound bond. While such thermal-bonding techniques are often satisfactory for bonding pipes for use in unpressurized systems such as drain lines, where the fluid flowing through the pipes is unpressurized and does not exert significant mechanical forces on the joints. However, where the fluid flowing through the pipe is to be pressurized, conventional thermal bonding techniques are often unsatisfactory because the bond is insufficiently strong and does not adequately seal the joint.

Yet another approach to improving the joint formed in thermal bonding has sought to ensure an extensive, continuous bond by winding the electrical heating coil directly on the rigid core used to form the fitting, thereby achieving a close, fully circumferential contact between the fitting and the fusible thermoplastic of the core. This approach has the inherent disadvantage that the inner diameter of the core must be made sufficiently large to accommodate an inserted pipe having a maximum diameter as allowed by the pipe specification, with the result that another inserted pipe having the smallest diameter allowed by the pipe specification will fit into the core very loosely with a possibly large gap which may not be fully eliminated by the thermal bonding, leaving unbonded portions and air bubbles in the joint. And, the expanding thermoplastic is still free to flow out of the joint causing a poor bond. Moreover, this approach requires hand layup of the cores and therefore is costly.

Accordingly, there has been a need for a means to form extensive, continuous and sound joints between thermoplastic articles by thermal bonding in an economical fashion. The present invention fulfills this need.

SUMMARY OF THE INVENTION

The present invention provides an improved configuration for forming a joint between two articles by a thermal bonding process, wherein an electrical heating element is placed between the articles to be bonded and heated by the passage of electrical current to fuse thermoplastic material adjacent the heating element so that after the articles are cooled they are bonded together by the fused material. The thermoplastic material in the bonded portion expands when fused, and the joint configuration constrains the expansion to increase the internal pressure of the fused thermoplastic material to force the thermoplastic material to flow to all areas of the desired bond, and also to eliminate air bubbles which might otherwise remain in the bond after cooling. With this invention, an extensive, continuous and sound joint having high strength can be produced between the articles to be joined in an economical manner.

In accordance with the invention, a female fitting is provided on the first of the articles to be bonded to receive the second of the articles to be bonded, which rests on a raised internal shoulder provided at the outermost extremity of the female fitting. A recess in the inner wall of the fixture is created by the internal shoulder to receive the electrical heating element between the inner wall of the fitting and the inserted second article to be bonded. When electrical current is passed through the heating element to fuse the thermoplastic provided with the heating element and also the thermoplastic in the parts themselves immediately adjacent the heating element, the shoulder confines the expansion of the thermoplastic to increase the internal pressure within the recess, thereby causing the thermoplastic to flow into all portions of the recess to create an extensive, continuous bond and to eliminate air bubbles found in the recess which would otherwise reduce the strength of the bonded portion. When the articles to be bonded are, for example, a T-shaped fitting and a pipe, the internal shoulder may be placed on a diametrically enlarged portion of the fitting. An annular clamp is placed over the outside of the enlarged portion during the thermal bonding to compress the shoulder on the inside of the fitting against the outer wall of the inserted pipe being joined, thereby fully enclosing the recess and increasing the internal pressure within the recess when the thermoplastic fuses and expands.

It will be appreciated from the foregoing that the present invention represents an advance in the technology of joining thermoplastic articles. With this configuration of joint, a bond extending the full dimension of the recess is formed and air bubbles are eliminated from the bond between the two articles by increasing the internal pressure within the joint during the bonding operation, with the result that the bond is more extensive, resistant to leakage, and free of internal defects. The internal shoulder on the enlarged portion of the female fitting may be formed with only minor modifications to existing tooling and methods, and allows the placement of a heating element of proven design within the recess formed by the shoulder in the internal wall of the enlarged portion of the fitting to effect the bonding process.

Other features and advantages of the present invention will become apparent in the following more detailed description, taken in conjunction with the accompanying drawings, which illustrate, by way of example, principles of the invention.

BRIEF DESCRIPTION OF THE DRAWINGS

The accompanying drawings illustrate a preferred embodiment of the invention. In such drawings.

DETAILED DESCRIPTION OF THE PREFERRED EMBODIMENT

Figure 1:
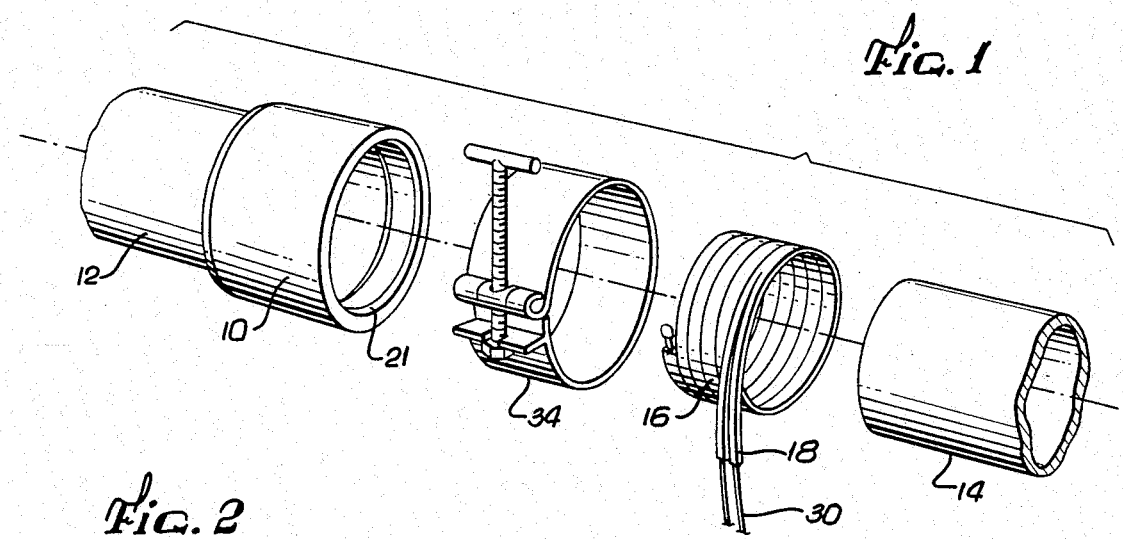
FIG. 1 is an exploded perspective view of a lap joint between a fitting and a thermoplastic pipe, embodying the features of this invention.

As is shown in the drawings for purposes of illustration, the present invention is embodied in a particular configuration for the diametrically enlarged portion 10 (also termed a "socket") of a fitting 12 for use in thermal bonding the fitting 12 to an inserted pipe 14 received within the enlarged portion 10. The inserted pipe 14 is bonded to the fitting 12 by the fusion and subsequent solidification of a thermoplastic material placed in the space between the enlarged portion 10 and the inserted pipe 14, and also a portion of the thermoplastic material comprising the enlarged portion 10 and the inserted pipe 14 immediately adjacent the bonded area. The thermoplastic material is heated by a spiral heating coil 16 located between the inner wall of the enlarged portion 10 and the outer wall of the inserted pipe 14, which is covered by a thermoplastic sheath 18 which first acts as an insulation and then fuses to form a portion of the bond between the fitting 12 and the inserted pipe 14.

Figure 2:
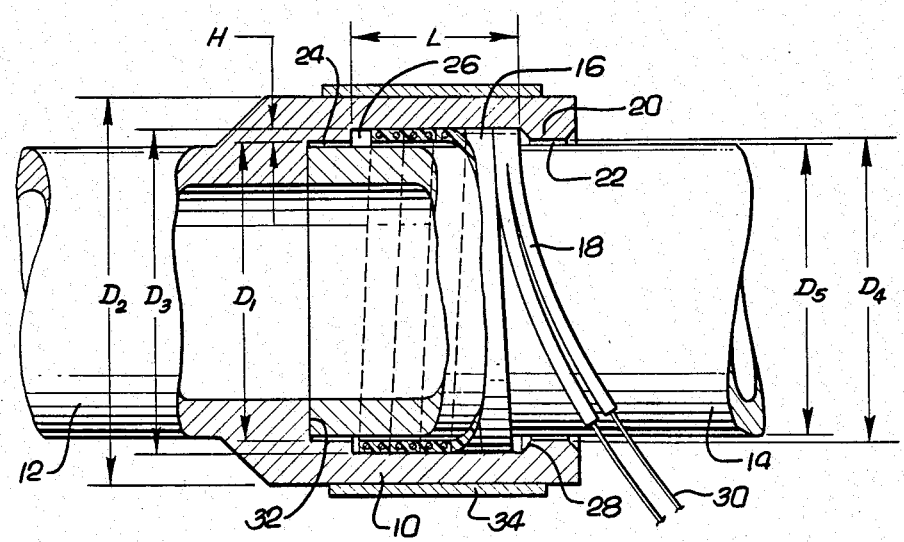
FIG. 2 is an enlarged partial sectional view of the joint of FIG. 1, in the assembled state prior to heating to form the bond.

In accordance with the present invention and as shown most clearly in FIG. 2, the sleeve-like enlarged portion 10 is formed integral with the cylindrical fitting 12 as a diametrically enlarged extension of the wall of the fitting 12, having an inner diameter $D_1$ sufficiently large to receive the inserted pipe 14 when inserted therein and an outer diameter $D_2$ sufficiently greater than an outer diameter $D_3$ of the heating coil 16 to provide structural strength to the joint. An internal shoulder 20 is provided on the inside wall of the enlarged portion 10 as a raised portion thereon at a location near the open end 21 of the enlarged portion 10, with a diameter $D_4$ slightly larger than the diameter $D_5$ of the inserted pipe 14 to allow the inserted pipe 14 to be inserted into the enlarged portion 10 with only a relatively small gap between the inserted pipe 14 and the shoulder 20. The radially most inward part of the shoulder 20 is a cylindrical surface lying parallel to the longitudinal axis of the fitting 12 and forming a shoulder land 22 upon which the inserted pipe 14 rests when it is inserted into the fitting 12. An inner land 24 of about the same internal diameter as the diameter $D_4$ of the shoulder land 22 is formed in the inner wall of the enlarged portion 10, and is spaced apart from and axially inwardly from the shoulder 20. Together, the inner land 24 and the shoulder land 22 cooperate to support and position the inserted pipe 14 when it is inserted into the enlarged portion 10.

Between the inner land 24 and the shoulder 20 is a recess 26 of internal diameter greater than the diameter $D_4$ of the shoulder land 22 and approximately equal to the outer diameter $D_3$ of the heating coil 16, and of sufficient size to receive the heating coil 16 entirely within the recess 26. The length L of the recess 26 is made slightly greater than the axial length of the heating coil 16, and the height H of the recess, as determined by the distance the inner land 24 and the shoulder land 22 extend from the inner wall of the enlarged portion 10, is made about the same as the thickness of the heating coil 16.

To improve the fabricability of the fitting 12 made in accordance with the present invention, the shoulder 20 is provided with an inclined surface 28 on the portion of the shoulder 20 facing inwardly from the open end 21, so that the male die used to form the fitting 12 may be easily removed in the manufacturing operation. The fitting 12 is fabricated by placing a male die or core (not shown) having a profile suitable for forming the inner wall of the bore of the fitting 12 and its enlarged portion 10 into a mold, and then injection molding or otherwise forming the female fitting 12 between the mold and the male die. To remove the male die after the fitting 12 is fabricated, the male die is moved axially toward the open end 21 of the enlarged portion 10 to force the walls of the enlarged portion 10 to expand in a radially outwardly direction a sufficient distance so that the male die may slide over the inclined surface 28 and out of the fitting 12. Alternatively, the recess may be formed by conventional machining methods.

To form a lap joint between the inserted pipe 14 and the fitting 12 having the enlarged portion 10 made in accordance with the present invention, the heating coil 16 is first inserted into the recess 26 with an electrical lead 30 portion of the heating coil 16 extending out of the fitting for subsequent connection to a source of electrical current. The inserted pipe 14 is inserted into the female enlarged portion 10 to rest against and be supported upon the inner land 24 and the shoulder land 22 and to butt against a stop 32 formed as an axially outwardly facing surface in the inner wall of the enlarged portion 10 to position the inserted pipe 14 axially in the fitting 12. A clamp 34 is placed over the outer wall of the enlarged portion 10 and tightened so that the shoulder land 22 is pressed radially inwardly to contact the outer wall of the inserted pipe 14 snugly but so that air may escape from the recess 26 as the thermoplastic material fuses. The clamp 34 thereby encloses the cavity formed by the recess 26, further fixes the inserted pipe 14 in position within the enlarged portion 10 to avoid any shifting during the fusing of the thermoplastic material and constrains expansion of the enlarged portion 10 to maintain pressure in the recess.

Figure 3:
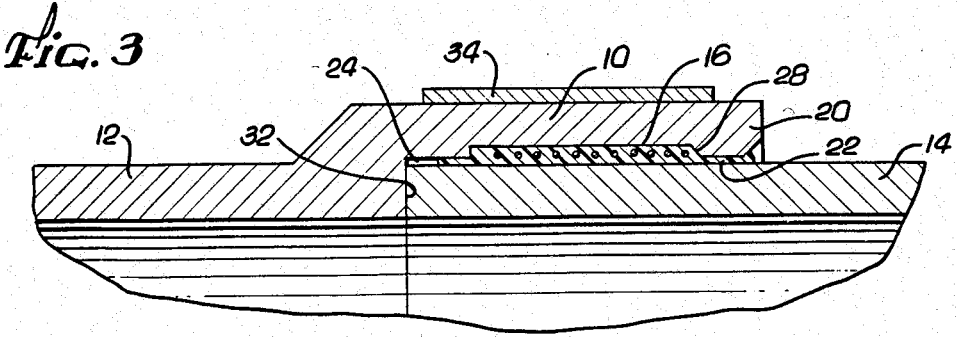
FIG. 3 is a further enlarged, fragmented sectional view of a portion of the joint of FIG. 1, after heating to fuse the thermoplastic material and form the bond between the fitting and the inserted pipe.

The bond between the fitting 12 and the inserted pipe 14 is then formed by passing an electrical current through the heating coil 16 to heat and then fuse the thermoplastic material adjacent the recess 26. In a preferred form of heating coil, the electrical wires thereof are covered by the thermoplastic sheath 18 which is fused by the heat to fill the recess 26, and in addition, portions of the wall of the enlarged portion 10 and the inserted pipe 14 immediately adjacent the recess 26 are also fused so that the fused thermoplastic sheath 18 and the fused wall material intermingle to remove any visible bonding line between the enlarged portion 10 and the inserted pipe 14. Although distinct walls of the recess 26 are shown in FIG. 3 as remaining after the bonding operation to illustrate the relative locations of the elements, preferably the walls adjacent the recess 26 are fused and commingled with the material formed by the fusing of the thermoplastic sheath 18 so that no distinct bond line remains.

The thermoplastic sheath 18 and the thermoplastic material in the walls of the enlarged portion 10 and the inserted pipe 14 expand upon heating and fusing, so that an increase in pressure is developed within the enclosed recess 26 during the heating and fusing operations due to the volumetric constraint imposed by the closure created by the contact of the shoulder 20 against the inserted pipe 14. The increased pressure forces the fused thermoplastic material to flow into all of the portions of the recess 26 under hydraulic pressure to create a bond extending around the entire circumference of the inserted pipe 14 and at least as long as the length L of the recess 26, and also collapses and eliminates air bubbles which otherwise might be trapped within the fused thermoplastic material within and adjacent the recess 26. Since the presence of air bubbles tends to weaken the bond between the fitting 12 and the inserted pipe 14 by providing a path for failure cracks to propagate, their elimination under the increased pressure within the recess 26 improves the strength of the final bond. After the electrical current is disconnected from the heating coil 16, the fitting 12 and inserted pipe 14 cool to harden the fused thermoplastic, and the clamp 34 is removed, leaving an extensive, continuous and sound bond free of air bubbles and other voids. During the fusing of the thermoplastic, some of the thermoplastic may extrude out of the recess 26 between the shoulder land 22 and the outer wall of the inserted pipe 14, under the pressure created within the recess 26, and this extruded material serves to create a further bond.

It will now be appreciated that, through the use of this invention, an extensive, continuous and sound bond may be formed between the fitting 12 and the inserted pipe 14 through the use of the enlarged portion 10 having the shoulder 20 which allows a pressurized thermal bonding operation to be conducted. Fusing of the thermoplastic sheath 18 of the heating coil 16, and a part of the wall of the enlarged portion 10 and the inserted pipe 14 adjacent the recess 26 creates a pressure within the recess 26 to force the thermoplastic to flow to all parts of the recess 26 and to collapse and eliminate air bubbles in the bonded portion which might otherwise decrease the bond strength. The bonding operation may be performed either by automated equipment in a factory location or manually at a remote site using the fitting of this invention.

Although a particular embodiment of the invention is described in detail for purposes of illustration, various embodiments may be made without departing from the spirit and scope of the invention. Accordingly, the invention is not to be limited except as by the appended claims.

I claim:

1. A bonding sleeve assembly for thermally bonding a first thermoplastic article to a second thermoplastic article, comprising:
    an enlarged generally cylindrical extension formed on one end of the first article having an opening for receiving one end of the second article;
    an internal annular recess formed within said enlarged extension and spaced axially a short distance from the one end of the first article to define a first internal annular land and between said recess and the one end of the first article;
    a second internal annular land spaced axially from the first land and separated therefrom by said recess;
    a spiral welding coil formed from thermoplastic material surrounding a heating element for insertion into said recess, said coil having an outside diameter generally corresponding with the inside diameter of said recess and an inside diameter generally corresponding with the inside diameter of the first land, said coil being manually compressible to a reduced diametric size to fit past the first land and having sufficient elasticity to return substantially to its original diametric size when positioned in said recess, the thermoplastic material being fusible when electrical current is passed through the heating element to bond the first and second articles with respect to each other; and
    means for compressing said first and second lands against the second article and constraining the expansion of the thermoplastic material within said recess when heated by the heating element, thereby increasing the pressure within said recess.

2. The assembly of claim 1, wherein the first article is a fitting and the second article is a pipe.

3. The assembly of claim 2, wherein said recess is integrally formed within said fitting.

4. The assembly of claim 1, wherein said spiral welding coil comprises a pair of electrically conductive wires embedded in an elongated thermoplastic sheath of generally rectangular cross-section, the wires being embedded in a spaced, generally parallel relationship, electrically coupled together at one end of the sheath and adapted for connection to an electrical current source at the other end, the sheath being wound into a plurality of turns defining a generally spiral coil and being fusible when electric current is passed through the wires.

5. The assembly of claim 1, wherein the first and second lands extend radially inwardly a distance substantially the same as the radial thickness of said spiral welding coil.

6. The assembly of claim 1, wherein said compressing means comprises a removable clamp.

7. A bonding sleeve assembly, comprising:
    a first thermoplastic pipe for conducting fluid and having an open end;
    a second fluid conducting thermoplastic pipe having one end sized for insertion into the open end of said first pipe;

an internal annular recess formed within said first pipe and spaced axially a short distance from the open end thereof;

a first internal annular land formed within said first pipe between the one end thereof and said recess;

a second internal annular land formed within said first pipe and axially spaced from said first land by said recess;

a spiral welding coil formed from expandable thermoplastic material surrounding a heating element having an outside diameter generally corresponding with the inside diameter of said recess and an inside diameter generally corresponding with the inside diameter of said first land, said coil being manually compressible to a reduced diametric size to fit past said first land into said recess and having sufficient elasticity to return substantially to its original diametric size within said recess, said thermoplastic material being fusible for bonding said first pipe to said second pipe when electrical current is passed through the heating element; and a removable clamp surrounding said first pipe for elastically compressing said first and second lands against said inserted second pipe, thereby confining the volume of said recess such that the pressure in said recess will increase when the expandable thermoplastic material in said recess is heated and fused.

8. A process for joining a first thermoplastic article to a second thermoplastic article, comprising the steps of:

forming a rigid sleeve on one axial end of the first article, including a pair of axially spaced internal annular lands separated by an internal annular recess;

forming a spiral welding coil including a heating element surrounded by a flexible thermoplastic sheath that fuses and expands when heated, the coil having an outside diameter generally corresponding with the inside diameter of the recess and an inside diameter generally corresponding with the inside diameter of one of the lands;

compressing the coil to a reduced diametric size and inserting it axially past the one land into the recess and allowing the coil to return elastically to its original diametric configuration;

inserting the second article into the sleeve of the first article with the welding coil positioned generally concentrically between the first and second articles;

applying a clamp around the sleeve to radially compress the lands into contact with the second article, thereby confining the volume of the recess such that the pressure in the recess will increase when the expandable thermoplastic sheath is heated and fused; and applying electrical current to the heating element until the thermoplastic sheath fuses and bonds together the sleeve, the sheath, and the second article.

9. The process of claim 8, wherein the first article is a fitting and the second article is an inserted pipe.

10. Two bonded articles joined together by the process of claim 8.

* * * * *